July 29, 1941. H. L. TOFT 2,251,210
POTATO DIGGER
Filed Sept. 12, 1940 4 Sheets-Sheet 3

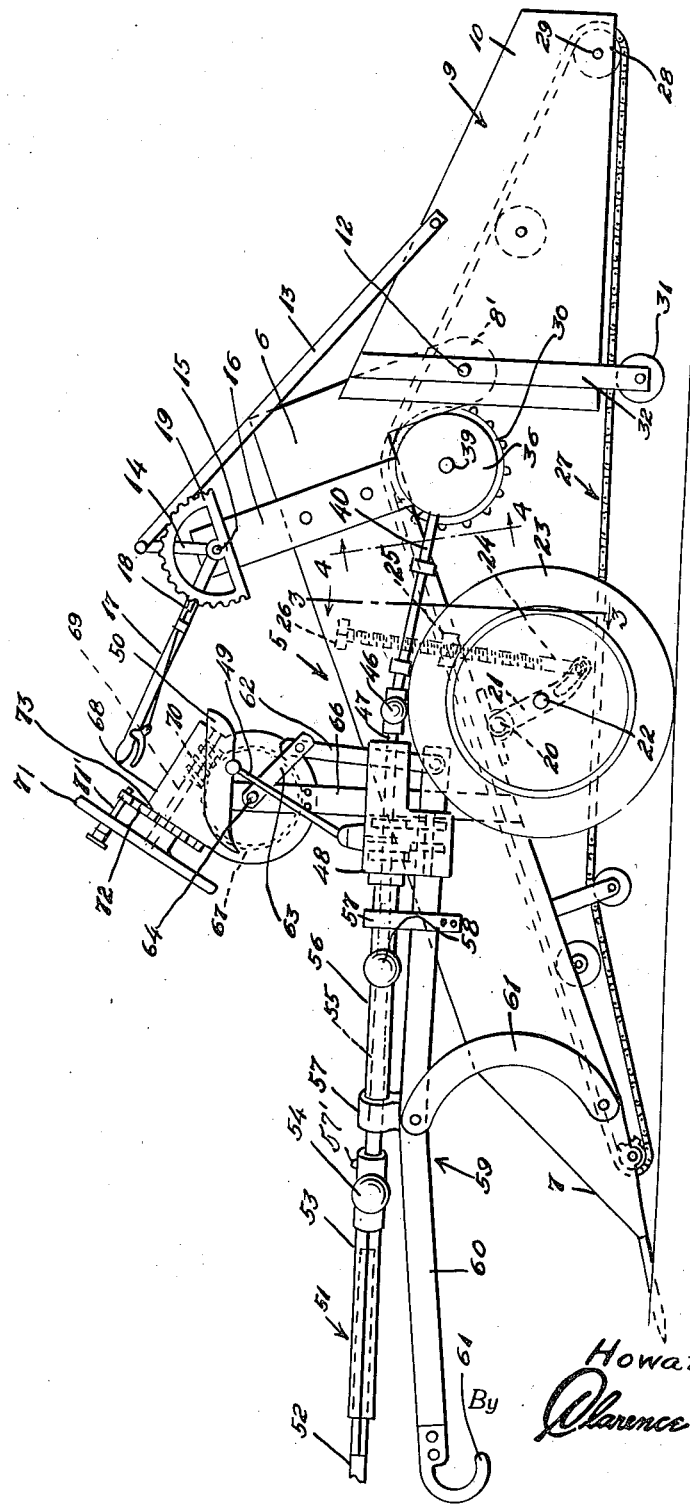

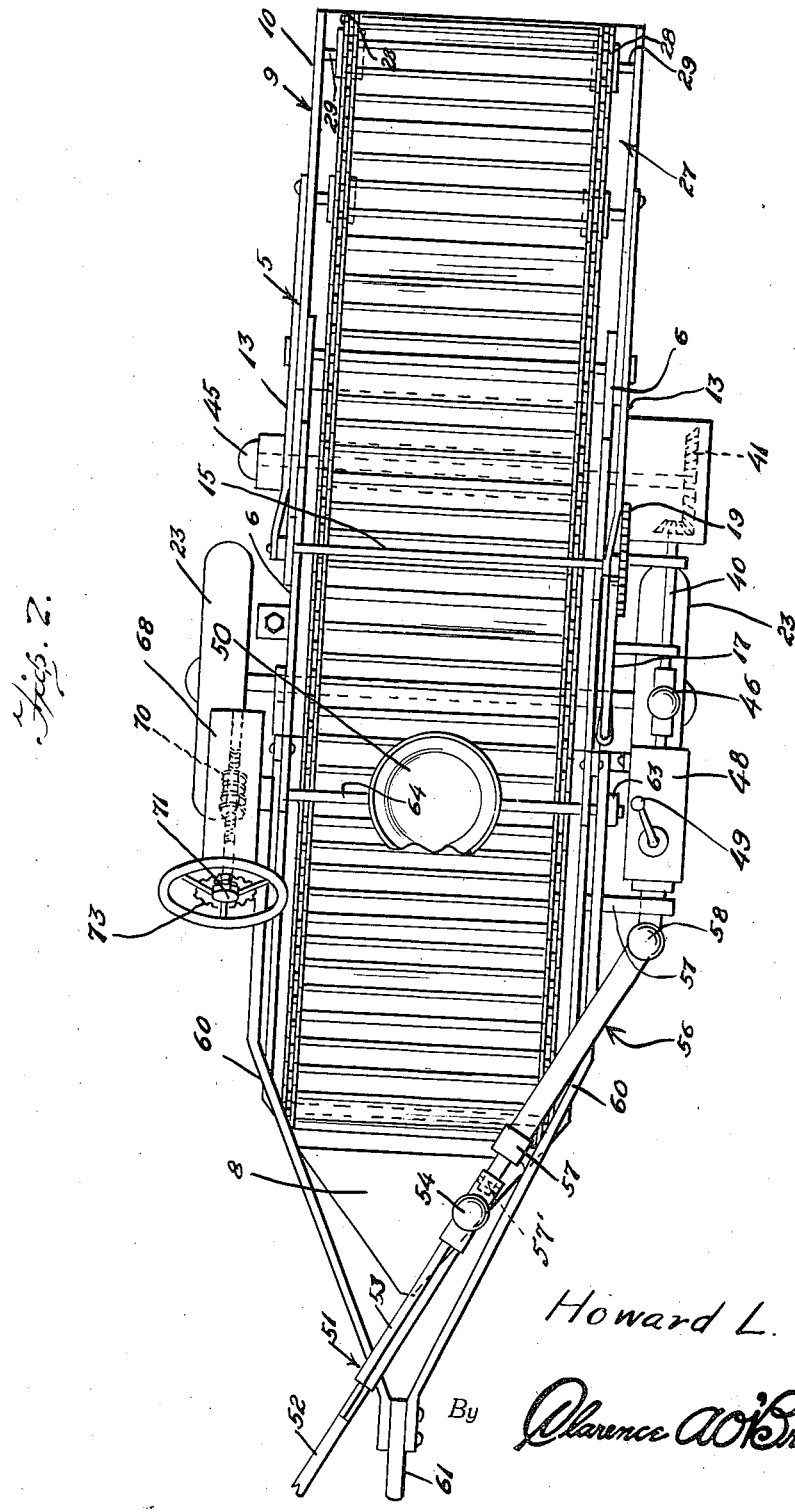

Inventor
Howard L. Toft

By Clarence A. O'Brien

Attorney

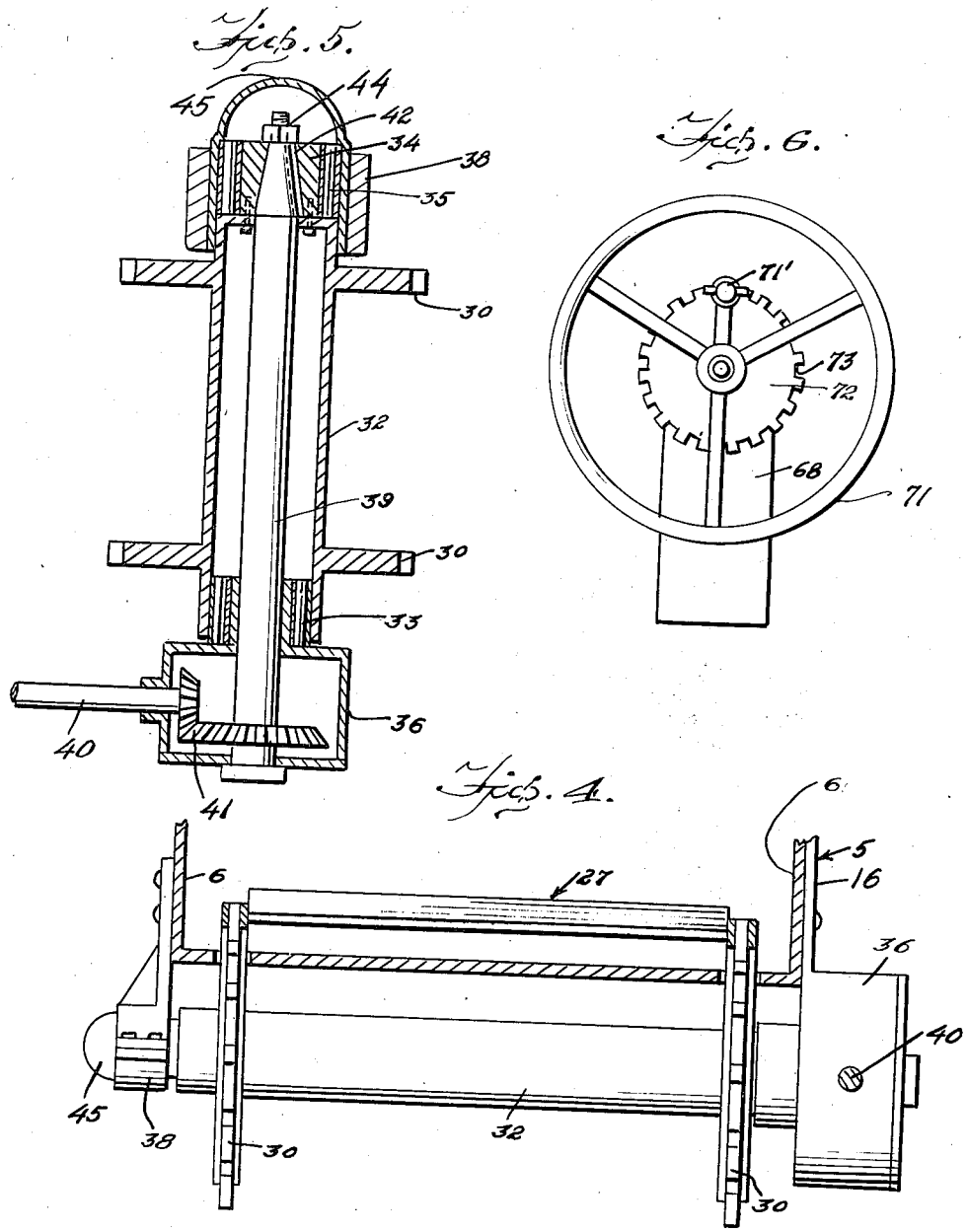

Patented July 29, 1941

2,251,210

UNITED STATES PATENT OFFICE 2,251,210

POTATO DIGGER

Howard L. Toft, Huston, Idaho

Application September 12, 1940, Serial No. 356,531

2 Claims. (Cl. 55—51)

This invention relates to potato diggers, and has for the primary object the provision of a device of this character wherein the conveyor thereof may be driven by power derived from the tractor employed as the draft medium for the device and which includes means for rendering the conveyor inoperative should the latter become clogged from any cause to prevent major damage to the device, and also includes means for driving the conveyor at variable speeds.

Another object of this invention is the provision of an improvised draft hitch for the device which may be quickly and conveniently adjusted whereby the device while in operation may be regulated to vary the depth in which it will act in the soil and to prevent the device from readily getting out of control.

A further object of this invention is the provision of means whereby the angle of the bed of the device may be varied so that said device may be made to operate in different kinds of soil to bring about a satisfactory separation of the soil and the potatoes.

With these and other objects in view as will become more apparent as the description proceeds, the invention consists in certain novel features of construction, combination and arrangment of parts which will be hereinafter more fully described and claimed.

For a complete understanding of my invention, reference is to be had to the following description and accompanying drawings, in which—

Figure 1 is a side elevation illustrating a potato digger constructed in accordance with my invention.

Figure 2 is a top plan view illustrating the device.

Figure 4 is a transverse sectional view taken on the line 4—4 of Figure 1.

Figure 5 is a detail sectional view illustrating a driven shaft and a driven sleeve for imparting movement to the endless conveyor.

Figure 6 is a detail elevational view illustrating a hand operated wheel and detent for the control or regulation of the draft hitch.

Figure 7:
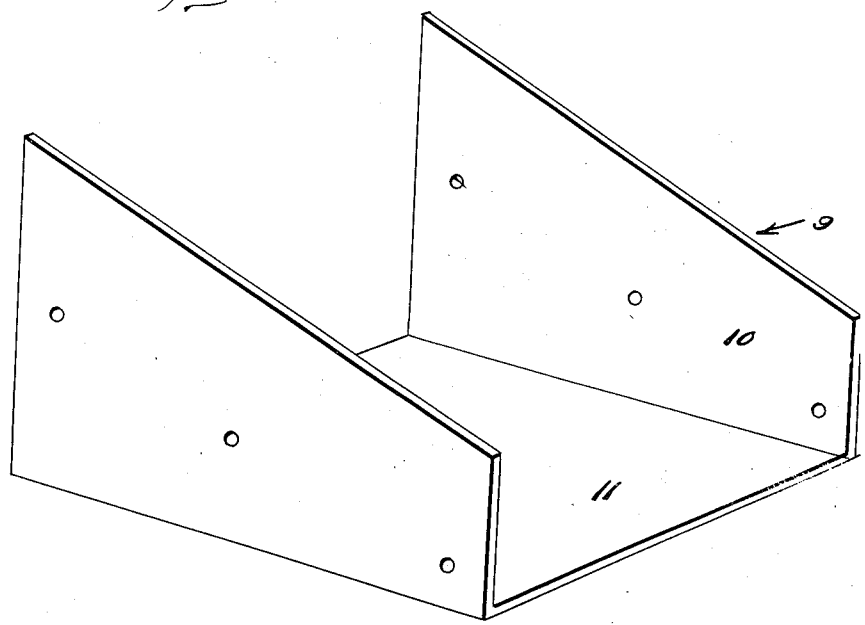
Figure 7 is a perspective view illustrating the tail section of the bed of the device.
Figure 3:
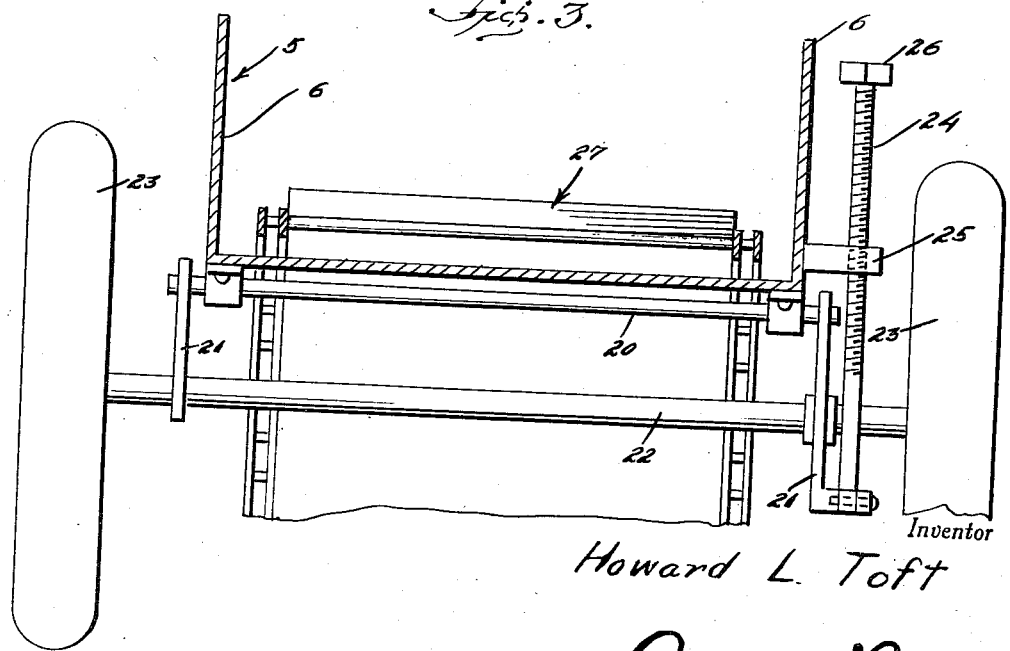
Figure 3 is a transverse sectional view taken on the line 3—3 of Figure 1.

Referring in detail to the drawings, the numeral 5 indicates the bed of the device consisting primarily of side panels 6 having the forward ends tapered, as shown at 7, and to which is suitably connected a plow share 8. The side panels at the rear ends thereof are provided with depending portions 8' for the support of a tail section 9 of the bed of the device. The tail section includes side panels 10 and a bottom wall 11, the side panels being pivotally mounted on the depending portions 8 of the side panels 6, as shown at 12. Connecting links 13 are pivotally connected to the panels 10 and to arms 14 secured on a shaft 15 journaled on uprights 16 carried by the panels 6. A hand operating lever 17 is secured to the shaft 15 and is provided with a detent 18 operating in conjunction with a fixed segmental rack 19 whereby the tail section of the bed of the device may be raised and lowered and secured in any of its adjusted positions.

A shaft 20 is secured to the side panels 6 substantially intermediate the ends thereof and is arranged transversely of the bed 5 and has secured thereto arms 21. It is to be understood that the shaft 20 is mounted in journals on the bed and the arms 21 carry axles 22 on which ground wheels 23 are journaled. One of the arms 21 has a pin and slot connection with an adjusting stem or screw threaded in a nut 25 mounted on the panels. The adjusting screw 24 has a head 26 to which a wrench or suitable tool may be applied for turning the adjusting screw in opposite directions for the purpose of varying the inclination of the bed 5 on the ground wheels.

A suitable endless conveyor 27 has the upper run thereof operating between the side panels of the bed and the panels 10 of the tail section 9 and extends from the plow share to the discharge end of the tail section of the bed. The endless conveyor is of the skeleton formation including a series of rods and flights if desired and also includes endless sprocket chains trained over sprocket gears 28 secured on shafts 29 arranged at the forward and rear ends of the bed and its tail section. The sprocket chains also are trained over drive sprocket gears 30. The lower runs of the sprocket chains are supported by idler gears or rollers 31 journaled on hangers 32 carried by the bed 5 or the side panels 6 thereof and the panels 10 of the tail section 9.

The sprocket gears 30 are integral with a sleeve 32 and one end of the latter is supported by anti-friction rollers 33 and the other end has secured thereto a block 34 which is supported by anti-friction rollers 35. The anti-friction rollers 33 are supported by a housing 36 while the anti-friction rollers 35 are supported by a bearing 38 carried by the bed 5. The housing 36 encloses gears that connect a shaft 39 to a shaft 40, the gears being indicated by the character 41. The shaft 39 extends through the sleeve 32 from the housing 36 and is keyed in the block 34, as shown at 42, also retained therein by a nut 44. A suitable dust cap 45 is arranged over the keyed end of the shaft 39 and block 34 and is carried by the bearing 38.

The shaft 40 is connected to a universal joint 46 which is in turn connected to a power take off shaft 47 of a variable speed transmission 48 mounted on the bed 5 of the device, the control lever of which is indicated by the character 49 and is arranged adjacent the operator's seat 50. A power shaft 51 including telescopic sections 52 and 53 has the section 52 thereof connected in a suitable way to the power takeoff of a tractor (not shown) and which is employed as a draft medium for the device. The section 53 of the power shaft is connected to a universal joint 54 which is in turn connected to a shaft 55, mounted in a suitable housing 56 supported by bearings 57 and including a shear pin 57'. A universal joint 58 is included in the shaft 55 and the latter is connected to the variable speed transmission 48. One bearing 57 is supported by a draft hitch 59 and the other is attached to a side panel 6.

The draft hitch 59 includes beams 60 which converge toward each other in the direction of the forward ends thereof and are connected to a coupling hook 61 used for connecting the draft beams to the tractor. The rearward ends of the draft beams straddle the side panels 6 of the bed 5. Arcuately curved members 61 are pivotally connected to the draft beams 60 substantially intermediate the ends thereof and are fixed on the side panels 6 of the bed 5 adjacent the forward end of said bed. The rear ends of the beams are pivotally connected to links 62 which in turn are pivotally connected to arms 63 secured to the ends of a shaft 64. The shaft 64 is journaled in uprights 66 and has secured thereto a worm gear 67 mounted in a suitable housing 68 supported by the uprights 66. Journaled in the housing 68 is a shaft 69 having secured thereto a worm 70 which meshes with the worm gear. An operating wheel 71 is secured to the shaft 69 and carries a spring influenced detent 71' coactive with teeth 72 formed in the periphery of a plate 73 fixed on the housing 68. The detent engaging with the teeth of the plate 73 will releasably secure the hand wheel against rotation. The arms 63 secured to the ends of the shaft 64 and to the connecting links 62 provide means for raising and lowering the rear ends of the draft beams 60. This construction is for the purpose of increasing and decreasing the leverage between the present invention and the tractor to render the digger easy to operate without sacrificing distance in which the plow share may be raised and lowered with respect to the ground. Also this arrangement will permit the depth in which the plow share may operate in the soil to be easily varied while the device is in operation.

In the operation, the device trailing behind a tractor and driven by power derived from said tractor will efficiently dig potatoes from the ground and carry the potatoes with the soil rearwardly by means of the conveyor. The movement of the potatoes with the conveyor brings about separation thereof from the dirt so that the dirt may gravitate to the ground while the potatoes are carried still further rearwardly through the tail piece 9 and discharged in rows upon the ground ready for collection or if desired, the potatoes may be caught in suitable containers (not shown) arranged at the rear of the tail section 9 of the bed.

The telescopic sections of the power shaft 51 permit the device to be coupled closer or further away from the tractor to meet different operating conditions. Also, it will be seen that the device is convenient to operate in relation to the tail section of the bed so that the discharge of the potatoes at varying distances from the ground can be easily brought about.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a potato digger, a bed including side panels, a plow share at the forward end of the bed, ground wheels for the support of the bed, means for adjustably connecting the ground wheels to the bed for varying the inclination thereof with respect to the ground, an endless conveyor having one run thereof extending through the bed between the panels thereof, a tail section pivoted on the rear end of the bed and including side panels and having said run of the conveyor extending therethrough, means carried by the bed for the adjustment of the tail section with respect to the ground, a draft hitch connecting the bed to a tractor, a variable transmission carried by the bed, a power shaft including universal joints and telescopic sections connected to the transmission and to the power takeoff of the tractor, a shaft journaled transversely of the bed, means for connecting the shaft to the transmission and including a universal joint, a sleeve journaled on said shaft, a driving means between said sleeve and the shaft, sprocket gears secured to the shaft, said conveyor including endless chains engaging said sprocket gears.

2. In a potato digger, a bed, ground wheels for the support of said bed, an endless conveyor for said bed, a plow share at the forward ends of the bed and the conveyor, draft bars converging towards their forward ends and equipped with means for connection to a tractor and straddling the bed, arcuately curved arms pivotally connected to the draft bars and fixed to the bed, an upright on the bed, a power delivery means for receiving power from the tractor and delivering the same to the conveyor and including a variable transmission and being partly supported by the draft bars, a shaft journaled on the bed, arms secured to said shaft, connecting links pivoted to said arms and to the rear ends of the draft bars, a worm gear secured to said shaft, a housing mounted on the upright and receiving the worm gear, a second shaft journaled in said housing and including a worm meshing with the worm gear, a hand wheel secured to the second shaft, a toothed plate secured to the housing, and a spring influenced detent carried by the hand wheel to coact with the toothed wheel in securing the second shaft against rotation.

HOWARD L. TOFT.